United States Patent [19]

Anderson

[11] Patent Number: 4,750,258
[45] Date of Patent: Jun. 14, 1988

[54] APPARATUS FOR AND METHOD OF SIMULTANEOUSLY, AXIALLY INSERTING MULTIPLE POLE, MULTIPLE PHASE WINDINGS

[75] Inventor: Eugene W. Anderson, St. Louis, Mo.

[73] Assignee: Emerson Electric Co., St. Louis, Mo.

[21] Appl. No.: 918,100

[22] Filed: Oct. 14, 1986

[51] Int. Cl.$^4$ .................. H02K 15/00; B23P 19/00
[52] U.S. Cl. ...................................... 29/596; 29/732; 29/736
[58] Field of Search .................. 29/596, 606, 732, 736

[56] References Cited

U.S. PATENT DOCUMENTS

| 3,845,548 | 11/1974 | Arnold | 29/596 |
|---|---|---|---|
| 3,857,171 | 12/1974 | Lund | 29/732 |
| 3,949,464 | 4/1976 | Walker | 29/606 |
| 4,538,349 | 9/1985 | Nakamura | 29/596 |

FOREIGN PATENT DOCUMENTS

| 0094948 | 7/1981 | Japan | 29/736 |
|---|---|---|---|
| 0117560 | 9/1981 | Japan | 29/736 |
| 0127548 | 7/1983 | Japan | 29/732 |

Primary Examiner—P. W. Echols
Attorney, Agent, or Firm—Polster, Polster & Lucchesi

[57] ABSTRACT

Apparatus is disclosed for the simultaneous, axial insertion of multiple pole, multiple phase windings into the slots of a stator of an electric motor or other dynamoelectric machine. Coil groups are placed on a circular array of fingers of an axial coil inserter, with chord segments of the coil groups extending across the circular opening of the circular array of fingers. The coil groups are arranged in pairs with each pair being angularly and axially offset with respect to one another. A stripper is axially movable within the circular array of fingers so as to substantially simultaneously engage portions of the chord segments of the coil groups thereby to insert the coil groups into the slots of the stator. The stripper has a number of operative surfaces facing axially outwardly which are disposed circumferentially on the stripper as to be in radial register with the chord segments of their respective chord groups, with the operative surfaces being axially spaced or stepped from one another so that as the stripper is moved axially outwardly, these various operative surfaces on the stripper substantially simultaneously engage their respective chord segments to thereby substantially simultaneously insert the coil groups into the stator slots. A method of simultaneously inserting such windings is also disclosed.

12 Claims, 7 Drawing Sheets

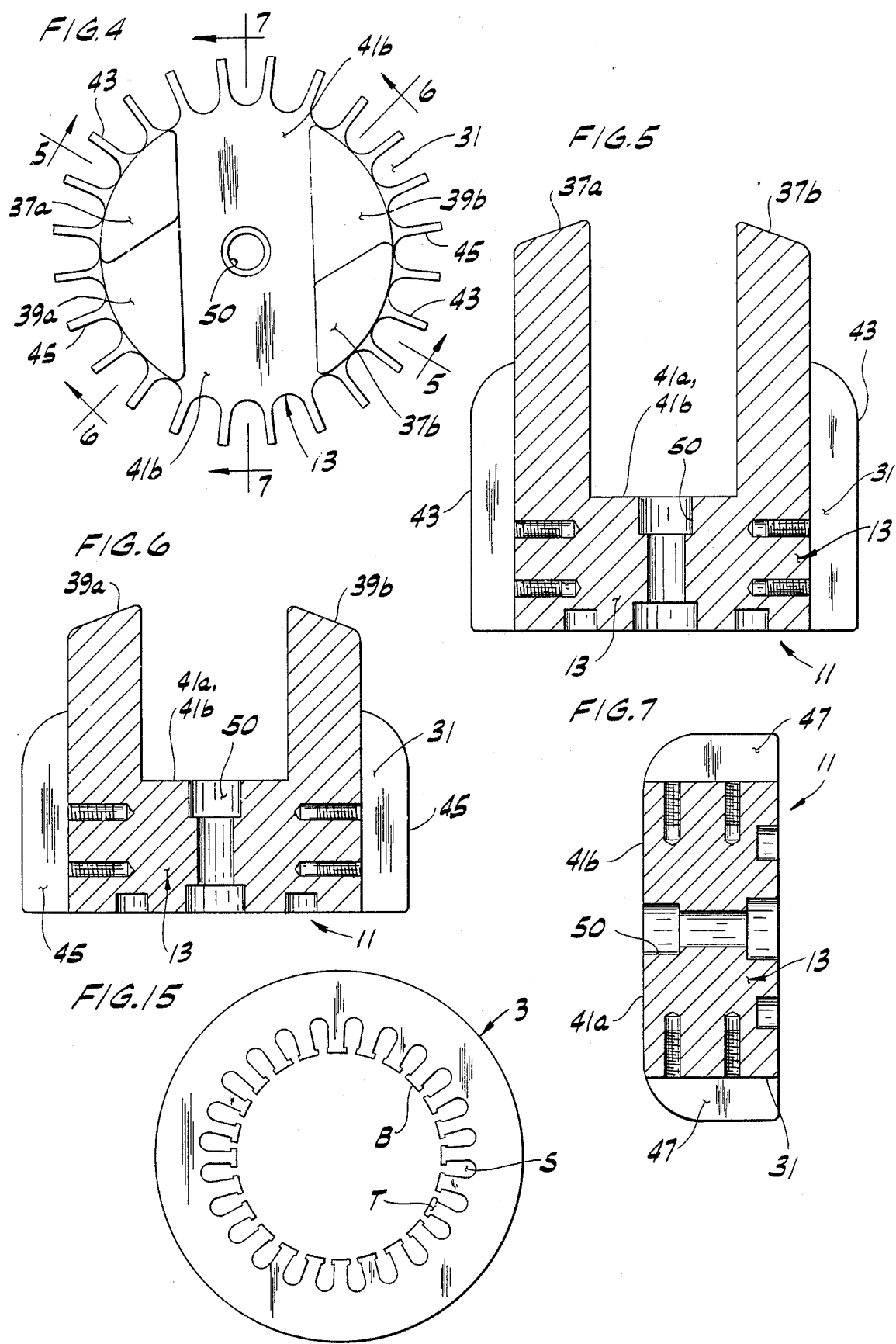

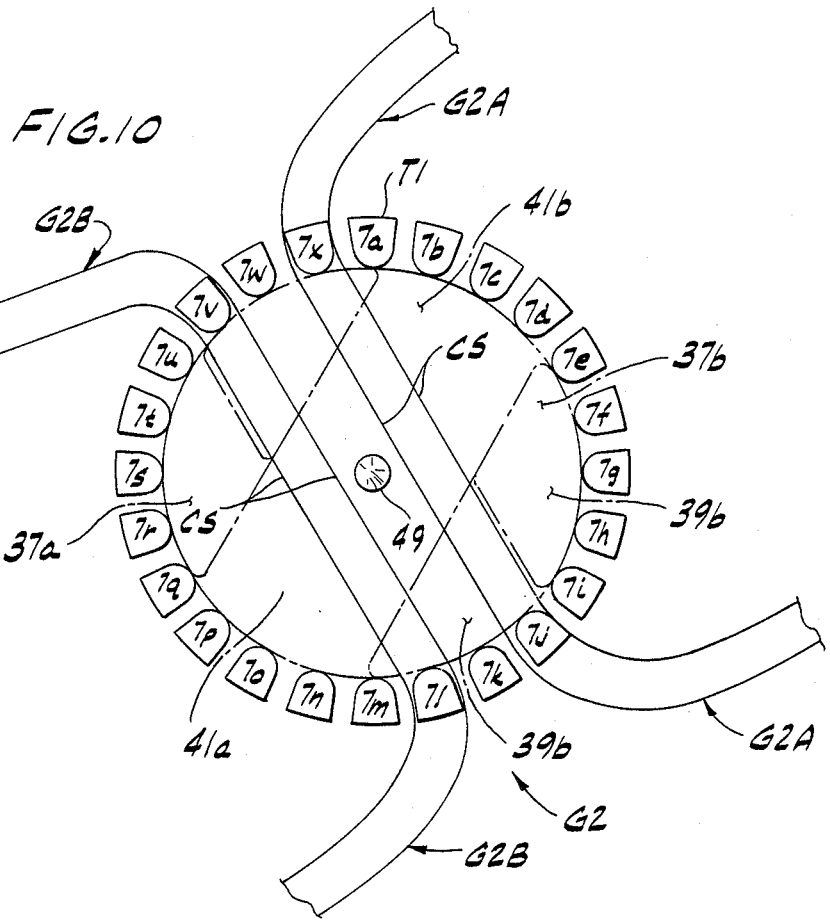
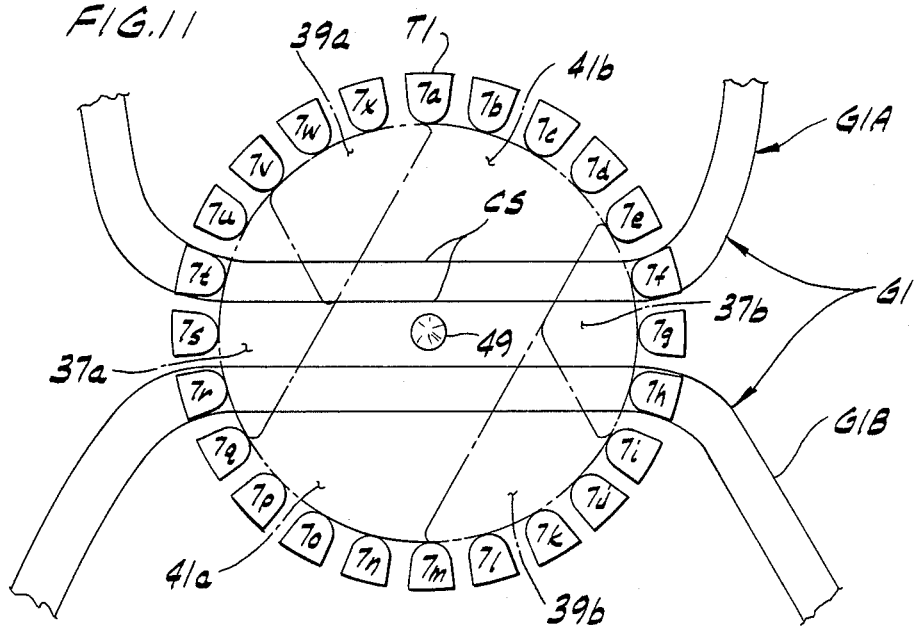

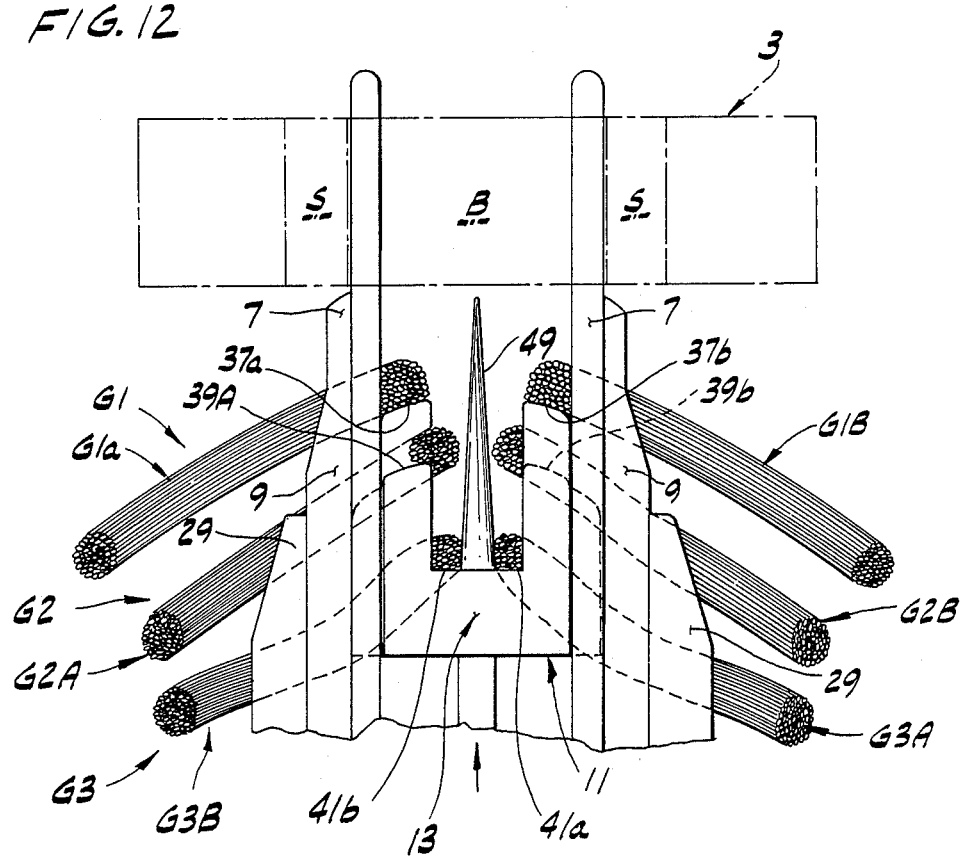
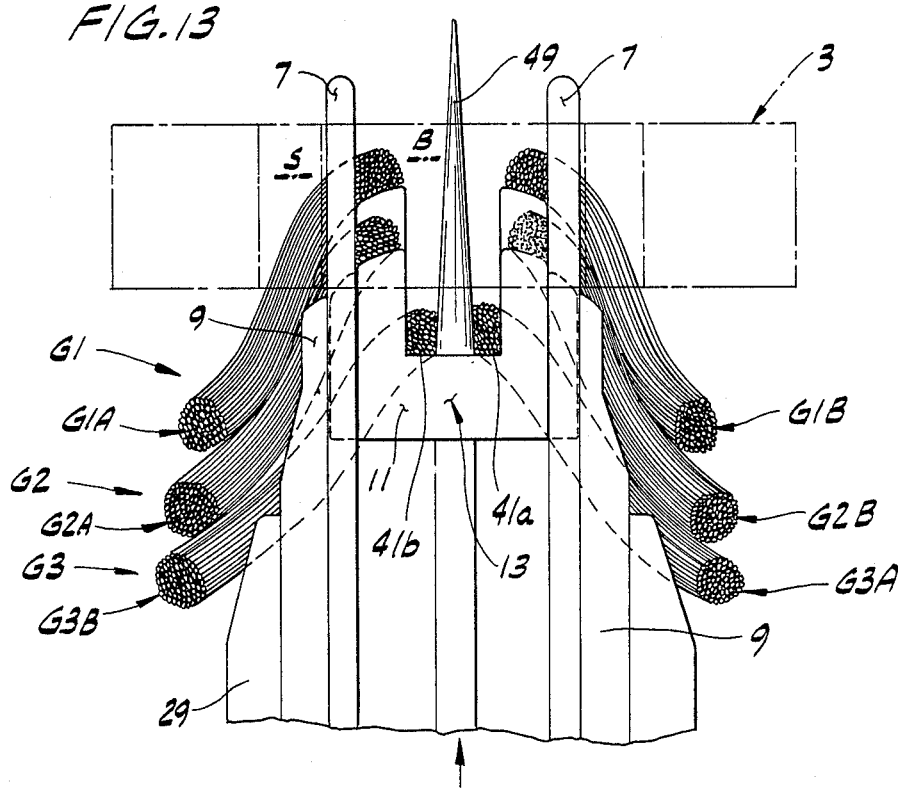

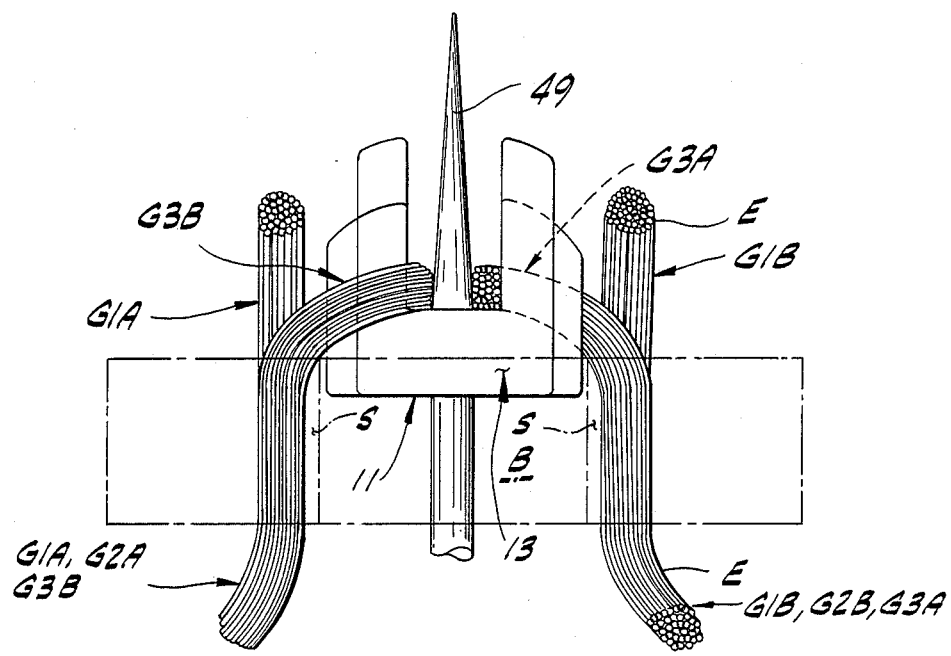

APPARATUS FOR AND METHOD OF SIMULTANEOUSLY, AXIALLY INSERTING MULTIPLE POLE, MULTIPLE PHASE WINDINGS

BACKGROUND OF THE INVENTION

This invention relates to apparatus for and a method of simultaneously axially inserting the windings of a multiple pole, multiple phase electric motor or other dynamoelectric machine into the radial slots of its stator core.

Generally, a stator for an electric motor or other dynamoelectric machine comprises a stack of pre-punched laminations of a suitable ferromagnetic sheet material forming the stator core. Each of the laminations has a central opening therein with a plurality of radially extending teeth spaced at equal angular intervals defining a plurality of radially extending slots between the teeth. Typically, the inner ends of the teeth are part-circular so as to define a central bore for the stator. In an electric motor, windings, comprising coils of copper magnet wire coated with a suitable varnish electrical insulation material, are inserted into the slots in a desired arrangement so as to generate a desired magnetic flux field when energized. The portions of the coils extending over the end faces of the motors between the slots receiving the coils are referred to as end turns.

In recent years, the coils constituting the windings of the stator have been inserted into the stator by means of axially operable coil assembling apparatus, such as is illustrated in U.S. Pat. No. 3,324,536, granted to Donald E. Hill on June 13, 1967. With such axially operable coil assembling apparatus, pre-wound coils are placed over a circular array of spaced fingers, with one of the fingers being in register with a respective tooth of a stator, and with portions of the pre-wound coils spanning between the fingers and constituting coil chord segments. Then the stator is installed on the upper ends of the fingers with the teeth of the stator in radial register with the fingers and with the stator being fixedly held in place by suitable clamp means. Then, an axially movable ram is actuated so as to move a stripper axially (outwardly) within the circular array of fingers such that the outer face of the stripper engages the chord segments of the coils placed on and spanning between the fingers, and such that the stripper pushes the chord segments upwardly and causes the side portions of each of the coils to "flow" through the gaps between the fingers and to be laid within their respective slots of the stator core. The ram continues to advance to its fully extended position such that the side portions of the coils are fully inserted into their respective slots, such that the chord segments initially spanning between the fingers constitute the end turns of the windings at the upper end face of the stator core, and such that the end portions of the coils opposite the chord segments constitute the end turns of the winding at the opposite end face of the stator core. The slots of the stator are often provided with suitable plastic insulators so as to electrically insulate the windings from the stator and to protect the windings from abrasion on the stator as they are inserted into the slots. In the manner disclosed in the above-noted U.S. Pat. No. 3,324,536, insulative wedges of suitable plastic sheet material may be inserted into the slots after the coils have been inserted by means of the axial coil inserter so as to hold the coils in place.

While such axial coil inserting apparatus have worked well for their intended purposes, there have been long-standing problems, particularly with regard to inserting the windings for multiple pole, multiple phase electric motors, or for other windings in which the chord segments of the coils are axially overlapped with one another after they have been placed on the fingers. For example, in a two-pole, three-phase motor, six different coil groups or coil sets must be inserted into the slots of the stator such that the six coil groups constitute the poles for the windings. Typically, these coils groups are arranged in three pairs, with each coil group of each pair being diametrically opposed to its respective pair member, and with each of the three pairs being angularly offset with regard to the next adjacent coil group pair by an angle of about 120 degrees. In this manner, the chord segments of the coils of each of the coil groups placed on the axial fingers of the coil inserter extend across the circular opening between the fingers cross and axially overlie or overlap one another.

Upon inserting the windings of such multiple pole, multiple phase electric motors, as hereabove described, utilizing the coil assembling apparatus, as shown in U.S. Pat. No. 3,324,526, problems were encountered in that the stripper of the coil inserting apparatus would first engage the lowermost chord segments of the lowermost pair of coil groups positioned on the fingers such that upon axial advancement of the stripper, and the chord segments of lowermost pair of coil groups would be forced into the chord segments of the upper coil groups. Thus, this lowermost pair of coil groups must exert sufficient axial force on the other coil groups to effect axial movement of all of the coil groups relative to the stator so as to cause them to move axially with respect to the fingers and to the stator for being laid in their respective stator slots. However, this resulted in the application of excessive force to at least certain of the wires comprising the various coils, which resulted in undue stretching and abrading of the magnet wire, with the consequent deformation of the magnet wire and loss of the electrical insulation therefrom.

To overcome these long-standing problems, such multiple pole, multiple phase windings for electric motors were often axially inserted into the stator in steps. First, a first pair of coil groups would be placed on the fingers, with each of the coil groups being diametrically opposed to one another such that the chord segments extending between the fingers did not axially overlap with one another. The stator would then be inserted onto the fingers and clamped in place. Then, the stripper would be advanced so as to insert this first pair of coil groups into their respective slots. Then, the stator would be removed, a second pair of coil groups would be placed onto their respective fingers, the stator would be inserted on the fingers and clamped in place, and the stripper would be advanced thereby to insert this second pair of coil groups into their respective slots. This procedure would be repeated until all of the pairs of coil groups were properly inserted into their respective slots. While this method of inserting multiple pole windings for a multiple pole, multiple phase motor could be done with coil assembling apparatus, generally as shown in the above-noted U.S. Pat. No. 3,324,536, it required separate placements of the pairs of coil groups for the different phases in the stator. In order to insert the windings of a two pole, three phase motor, three separate insertion steps were required.

It will be appreciated that the separate placement of each of the pairs of coil groups in the stator required substantial additional labor, and thus substantially increased the cost of the three-phase stator assembly.

There has been a long-standing need for an axial coil inserting apparatus and a method which permitted the coil groups for multiple pole, multiple phase windings to be simultaneously inserted into the slots of the stator in one operation.

SUMMARY OF THE INVENTION

Among the several objects and features of this invention may be noted the provision of an axial coil inserter which is capable of simultaneously inserting multiple pole, multiple phase windings (or other axially overlapped windings) into a stator core in one operation of the axial coil inserter without damage to the magnet wire;

The provision of such an axial coil inserter in which binding of the coils with respect to the axial coil inserter is prevented;

The provision of such an axial coil inserter which relieves pressure and force on the individual coil groups during insertion thereby to minimize the possibility of damage to the magnet wire;

The provision of such axial coil inserting apparatus and a method of inserting coils which substantially reduces the labor required to insert multiple pole, multiple phase windings in a stator; and The provision of such axial coil inserting apparatus and method which facilitates subsequent winding end turn forming, blocking and lacing operations.

Apparatus is disclosed for the simultaneous axial insertion of axially overlapping windings into the slots of a stator of an electric motor or the like, with the stator having a central bore and a plurality of teeth spaced at equal angular intervals around the bore defining a slot between each of the teeth, with the slots extending radially outwardly from the central bore between the teeth. The windings comprise pairs of coil groups or sets positioned substantially diametrically opposite one another with respect to the stator bore. The axial coil inserter comprises a plurality of elongate fingers, one finger for each stator tooth. The fingers are arranged in a circular array, and have gaps therebetween. The axial coil inserting apparatus has means for rigidly supporting a stator on the array of fingers, with each of the fingers having an outwardly facing surface in register with a respective stator tooth, and with each of the gaps between the fingers being in register with respect to a stator slot. Each of the coil groups includes one or more coils of wire, with the pairs of coil groups being placed on the fingers such that the coils are received in respective gaps between the fingers, with a segment of the coils extending across a chord of the circular opening defined by the circular array of fingers. The pairs of coil groups are spaced axially from one another along the fingers, with the chord segments of the coils with each pair of coil groups being spaced axially relative to one another along the fingers. The axial coil inserter includes a stripper movable axially within the circular array of fingers from a retracted position in which the stripper is clear of the chord segments to an operative position for substantially simultaneously engaging all of the chord segments of the coil groups spaced axially along the fingers such that all of the chord segments are drawn axially by the stripper through the stator bore, and such that portions of the coil sets are pulled through their respective gaps between the fingers into their respective slots in the stator.

The method of this invention of substantially simultaneously inserting a plurality of axially overlapping coils of magnet wires into axial slots of a stator core is disclosed. The method is performed on an axial inserter having a plurality of fingers, one for each stator slot, arranged in a circular array with each finger in register with a respective stator tooth. A plurality of coil groups or sets is provided with each coil group having one or more coils. A first coil group is spaced axially above a coil group such that the portions of the coil groups extending between the fingers form chord segments which at least in part axially overlap with chord segments of the other coil group. The axial coil inserter has means for fixedly holding the stator core in fixed position with respect to the fingers. A stripper is positioned within the circular array of fingers and is axially movable with respect to the fingers from a retracted position in which the stripper is clear of the chord segments of the coil groups spanning between the fingers toward an operative position in which the stripper substantially simultaneously engages the chord segments of all of the coil groups. Specifically, the method comprises the steps of placing a first coil group on the fingers, with the chord segments thereof spanning between the fingers. Then, a coil group is placed on the fingers, with the second coil group being spaced axially on the fingers with respect to the first coil group. Then, the stripper is moved axially from its retracted position toward its operative position so as to substantially, simultaneously engage the chord segments of both the second and first coil groups thereby to substantially, simultaneously axially move the first and second coil groups along the fingers, and so as to substantially, simultaneously insert the coils thereof into their respective slots of the stator without the lowermost coil group placing substantial axial force on the second or upper coil group as all of the coil groups are substantially simultaneously inserted into the stator core.

BRIEF DESCRIPTION OF THE DRAWINGS

FIG. 4 is a top plan view of the stripper illustrated in FIG. 3;

FIG. 5 is a vertical cross sectional view, taken along line along 5—5 of FIG. 4, illustrating an upper pair of coil engaging surfaces and a lowermost pair of coil engaging surfaces;

FIG. 6 is a cross sectional view, taken along line 6—6 of FIG. 4, illustrating an intermediate pair of coil engaging surfaces and a lowermost or third pair of coil engaging surfaces;

FIG. 7 is a cross sectional view, taken along line 7—7 of FIG. 4, illustrating the lowermost pair of coil engaging surfaces;

FIG. 10 is a view similar to FIG. 8, illustrating an intermediate pair of coil groups placed on the fingers, with the chord segments thereof being engageable by the intermediate coil engaging surfaces of the stripper shown in FIG. 3;

FIG. 11 is a view similar to FIG. 8, illustrating an uppermost pair of coil groups placed on the fingers, with this last-mentioned pair of coil groups having the chord segments thereof being engageable by the uppermost coil engaging surfaces of the stripper;

FIG. 12 is a cross sectional view, taken along line 12—12 of FIG. 2, illustrating a stator core fixedly clamped into place on the fingers of the axial coil inserter, illustrating the stripper in its retracted position, and illustrating three pairs of coil groups placed on the fingers with the chord segments of the lowermost pair of coil groups spanning across the opening of the circular array of fingers of the inserter, and being engageable by the lowermost pair of coil engaging surfaces of the stripper, with the intermediate pair of coil groups being angularly and axially displaced from the lowermost pair of coil groups such that the chord segments of the intermediate pair of coil groups are engageable by the intermediate pair of coil engaging surfaces of the stripper, and with an uppermost pair of coil groups angularly and axially displaced with respect to the other two pairs of coil groups such that the chord segments of the uppermost pair of coil groups are engageable by the uppermost pair of coil engaging surfaces of the stripper;

FIG. 13 is a view similar to FIG. 12, illustrating the stripper as it moves from its retracted position (as shown in FIG. 12) toward its fully operable position (as shown in FIG. 14), with the coil engaging surfaces of the stripper substantially simultaneously engaging their respective chord segments of the pairs of coil groups thereby to substantially simultaneously axially insert the coils of the coil groups into their respective stator slots;

FIG. 14 is a view similar to FIGS. 12 and 13, illustrating the stripper in its fully operative position in which the coils are in their inserted positions within the slots of the stator, in which the chord segments of the coil groups remain, at least in part, in contact with their respective coil engaging surfaces of the stripper so as to at least in part form the winding end turns on the upper end face of the stator, and with the portions of the coils opposite their chord segments being drawn upwardly toward the bottom face of the stator so as to form the winding end turns at the bottom face of the stator core; and FIG. 15 is a top plan view of a stator core.

Corresponding reference characters indicate corresponding parts throughout the several views of the drawings.

DESCRIPTION OF PREFERRED EMBODIMENTS

Figure 1:
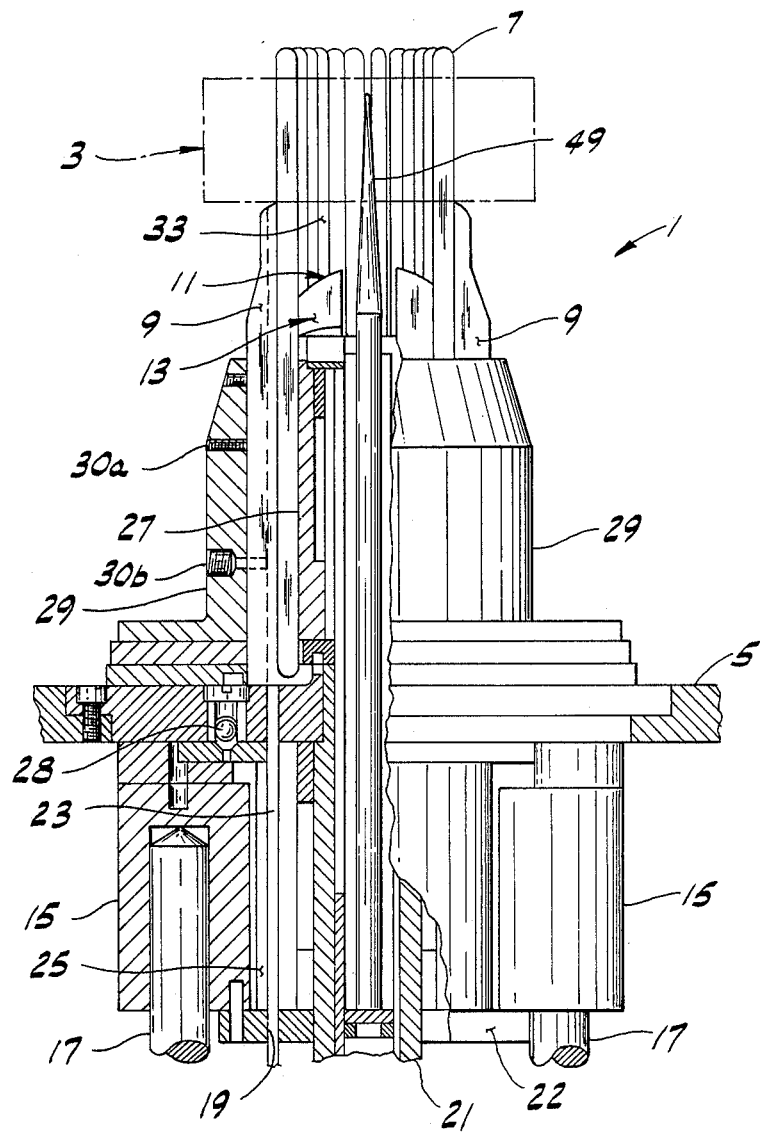
FIG. 1 is a partial, vertical cross section of a portion of an axial coil inserter of the present invention for substantially simultaneously axially inserting a plurality of axially overlapping coils (e.g., multiple pole, multiple phase windings) into the slots of a stator core of a dynamoelectric machine, and particularly illustrating a stepped stripper in accordance with this invention axially movable with respect to a stator from its retracted position (as shown in FIG. 1) to an operative position (as shown in FIG. 14) for simultaneously inserting all of the coils of the windings into the slots of the stator core.

Referring now to the drawings, and particularly to FIG. 1, a partial cross sectional view of an axial coil inserter is indicated in its entirety by reference character 1. Axial coil inserter 1 is broadly similar to the coil assembling apparatus described and shown in U.S. Pat. No. 3,324,536, issued June 13, 1967, to D. E. Hill, except for the differences in construction and operation, as will be particularly hereinafter described and pointed out. A complete description of the construction and operation of axial coil inserter 1 may be had by referring to the above-noted U.S. Pat. No. 3,324,536, which is herein incorporated by reference. However, some of the more salient elements of and features of the construction and operation of axial coil inserter 1 will be herein described.

Still referring to FIG. 1, axial coil inserter 1 is intended, within the broader aspects of this invention, to substantially simultaneously axially insert a plurality of axially and angularly overlapping coils constituting the windings W into a stator core 3. One common example of such axially and angularly overlapping coils is in the windings of a multiple pole, multiphase motor, as will be hereinafter described. However, within the broader aspects of this invention, even though windings W are particularly described for a two-pole, three-phase motor, it will be understood that the coil inserter and method of this invention may be utilized to insert a wide range of overlapping motor windings.

As is typical, the stator core 3 is constituted by a stack of laminations of suitable ferromagnetic sheet material, each of which is pre-stamped so as to have a central opening and a plurality of equally spaced notches extending radially outwardly from the central opening. When the laminations are stacked one on the other to a desired stack height thereby to constitute stator core 3, the central openings form a stator bore B and the notches form stator slots S, at substantially equal angular intervals around the stator core 3, with the stator slots being separated by respective teeth T. In the particular stator 3 illustrated herein, it will be understood that there are 24 teeth T and 24 corresponding slots S spaced at equal angular intervals around bore B. It will also be understood that the inner surfaces of teeth T are formed to be part-circular and thus define, at least in part, the circular periphery of stator bore B.

As illustrated in FIG. 1, axial coil inserter 1 has a rigid, stationary base plate 5 which, as illustrated in FIG. 1, is shown to be horizontal. However, in actual practice, it will be understood that the base plate 5 may be inclined to the horizontal such that the axial coil inserter faces toward the operator for operating efficiency. Axial coil inserter 1 includes a plurality (e.g., twenty-four) of fingers 7 arranged in a circular array spaced from one another with a gap g (see FIG. 9) between each of the fingers with the outer faces of the fingers being in register with and abutting against an inner part-circular face of a respective stator tooth T. The gaps g between fingers 7 are generally in register with a respective stator slot S. Fingers 7 extend upwardly from plate 5 and remain stationary with respect to the plate. Extending lengthwise of each finger 7 on the outside thereof is a respective bar 9 (there being 24 such bars, one for each finger). These bars, which are shown to terminate short of the upper ends of fingers 7, serve as guides for inserting insulative plastic sheet insulative wedges (not shown). Bars 9 are axially movable as a unit with respect to the stationary fingers 7.

Figure 2:
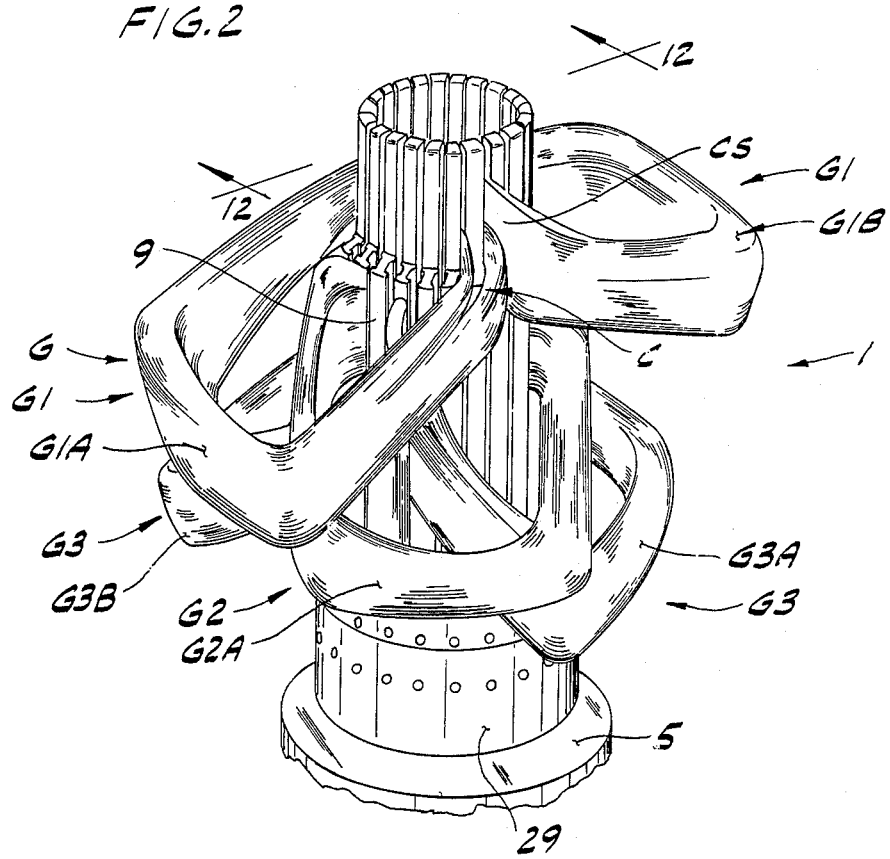
FIG. 2 is a perspective view of the axial coil inserter, showing a plurality of coil groups arranged in pairs diametrically opposite one another, with the pairs being spaced at equal angular intervals from one another around a circular array of fingers of the axial coil inserter, and with the pairs of coil groups being spaced axially with respect to one another along the length of the fingers.

As shown in FIG. 2, the circular array of spaced fingers 7 and bars 9 are disposed for having a plurality of coil groups G of pre-wound coils C placed thereon, with the coil groups being arranged in diametrically opposed pairs (G1A, G1B; G2A, G2B; and G3A, G3B), with each coil group of each pair being located diametrically opposite from its respective coil group constituting the pair, and with the pairs of coil groups being spaced at substantially equal angular intervals with respect to the others of the coil groups (e.g., at about 120 degrees from one another) around the circular array of fingers, and with the pairs of coil groups being axially displaced from one another along the length of fingers 7.

In accordance with this invention, a stepped stripper, as generally indicated at 11, is disposed within the circular array of fingers 7, and is axially movable from a retracted position (as shown in FIGS. 1 and 12) to a fully operative position (as shown in FIG. 14) for substantially simultaneously engaging the chord segments of each of the coil groups extending across the circular opening of the fingers (as shown in FIGS. 8–11) as the stripper is moved from its retracted position toward its fully operative position thereby to effect the insertion of the wires of coils of the various coil groups into their intended slots S of stator 3.

As shown in FIG. 1, axial coil inserter 1 includes a pair of sockets 15 carried by and extending below plate 5. Mounted in each of the sockets 15 is a guide rod 17 which extends downwardly from plate 5. A carriage (not shown) is slidable on guide rods 17 toward and away from plate 5. Mounted on the upper (forward) face of the carriage carried by guide rods 17 is a disk (also not shown). Clamped to the outer periphery of this disk in a circular array are the lower ends of a plurality of wedge push rods 19 (there being one for each of the bars 9). It will be understood, as explained in greater detail in the above-noted U.S. Pat. No. 3,324,536, that wedge push rods 19 together with bars 9 serve to insert insulating wedges of generally U-shaped cross section of a suitable synthetic resin dielectric sheet material, such as Mylar, into slots S of stator 3 after the windings W have been inserted therein so as to at least in part aid in holding the windings within the slots and to protect the windings. The carriage (not shown) mounted on the lower ends of guide rods 17 carries a ram 21 which extends upwardly (forwardly) toward plate 5. The carriage is secured to the upper end of a piston rod of a hydraulic cylinder (also not shown), by means of which the carriage and the ram may be moved up and down on the guide rods 17 between a lowered or retracted position, and a raised or operative position. Wedge push rods 19 slide in a plate 22 at the lower ends of sockets 15, with the plate 22 having a plurality of openings therein for receiving and guiding the wedge push rods 19.

Mounted centrally in plate 5 is a tubular spindle 23 which projects on both sides of plate 5. The spindle 23 has a shoulder engaging a lower face of plate 5, and is secured to the plate by a nut threaded onto the spindle engaging the upper face of the plate. Journaled on the lower end of spindle 23 is a wedge magazine 25. This magazine is formed around its periphery with a series of longitudinal slots having narrow entrances for receiving and holding wedges, as above described. It will be understood that the forming and loading of wedges is preferably carried out automatically by suitable mechanism housed in the cabinet of the present apparatus, which forms no part of the present invention, and hence is not described further herein.

At the upper end of spindle 23, the stationary fingers 7 and the axially movable wedge guide members or bars 9 are provided. A cylindrical fluted finger holder 27 is journaled for rotation around spindle 23. The finger holder has a plurality of longitudinal grooves which receive respective fingers 7, with the fingers extending endwise of the holder. The lower end of the finger holder engages a lower bearing 28, and the finger holder is removably retained on the spindle.

The outwardly facing surfaces of fingers 7 have longitudinal grooves therein for receiving the respective wedge guide or bar members 9. The side surfaces of bars 9 have grooves therein so that, between each pair of adjacent bars, there is a longitudinal guide through which an insulator wedge can be driven. A cylindrical housing 29 surrounds the circularly arrayed fingers 7 and bars 9. As shown in FIG. 1, threaded within the peripheral wall of housing 29 in alignment with each wedge guide member or bar 9 are two respective set screws 30a, 30b so as to clamp each finger to housing 29, thus combining these elements into a rigid body.

Figure 3:
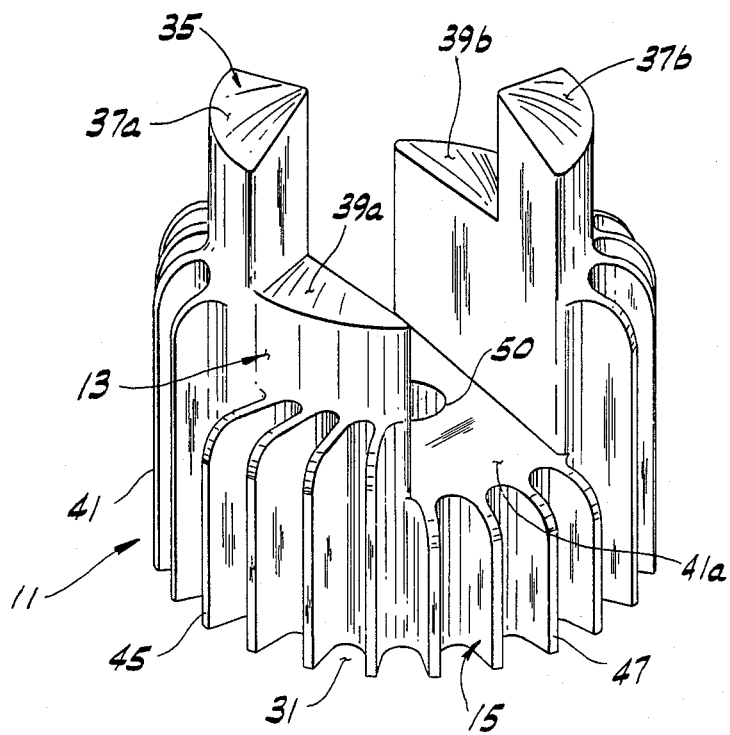
FIG. 3 is a perspective view of the stepped stripper of the present invention, illustrating three pairs of coil chord segment engaging surfaces, with each pair of the surfaces being diametrically opposed to one another, with the pairs of coil engaging surfaces being angularly displaced with respect to one another, and with the pairs of surfaces being axially displaced or stepped with respect to one another so as to substantially, simultaneously engage the chord segments of the pairs of coil groups placed on the coil inserting apparatus, as shown in FIG. 2.

Referring now to FIG. 3, stripper 11 is shown to comprise the above-noted stripper body, as generally indicated at 13, which has a plurality of longitudinally extending flutes 31, there being one flute for each finger 7, with each of the flutes receiving a respective finger, and with the stripper being slidably movable with respect to the fingers in longitudinal or axial direction with respect to the circular array of fingers 7. Fluted stripper body 13 is provided within a central opening 33 defined by fingers 7 for movement of the stripper within the array of fingers on a portion of ram 21, as is shown in FIG. 1. The stripper is axially movable from a lowered retracted position, as shown in FIG. 1, to a fully operative position in which the stripper is moved through bore B of stator core 3 to its fully operative position, as shown in FIG. 14, in which the stripper extends out beyond the upper face of stator core 3 for engaging chord segments CS of windings W and for axially inserting the windings into stator slots S in a manner as will hereinafter described in detail.

As shown in FIGS. 3–7, stripper body 13 is provided with a plurality of coil engaging surfaces, as generally indicated at 35, for substantially simultaneously engaging coil group chord segments CS, as will be hereinafter described in detail, for moving the coil groups G longitudinally with respect to fingers 7 and bars 9 and for the axial insertion of the coils into their respective slots S of stator core 3.

More specifically, stripper body 13 includes a first or upper pair of coil engaging surfaces 37a, 37b, spaced diametrically opposite one another for engaging portions of the chord segments CS of a first or upper pair of coil group G1A, G1B, placed in an axial outermost position on fingers 7 relative to the other coil groups, as shown in FIG. 2. Stripper body 13 further includes a second or intermediate pair of coil engaging surfaces 39a, 39b also diametrically opposite one another and angularly offset from the first or upper group of coil engaging surfaces 37, 37b by an angle of about 120 degrees, with the second or intermediate pair of coil engaging surfaces 39a, 39b being somewhat shorter than the first pair of coil engaging surfaces such that this second or intermediate pair of coil engaging surfaces 39a, 39b engages the chord segments CS of a second or intermediate pair of coil groups G2A, G2B, placed axially intermediately on fingers 7. Further, stripper body 13 includes a third or lowermost pair of diametrically opposed coil engaging surfaces 41a, 41b also angularly offset by approximately 120 degrees with respect to coil engaging surfaces 37a, 37b, and with respect to surfaces 39a, 39b, with this shorter or lowermost pair of coil engaging surfaces 41a, 41b engaging respective chord segments CS of a third or lower pair of coil groups G3A, G3B, which are disposed in an innermost axial position on fingers 7. In this manner, as will be explained in greater detail hereinafter in regard to FIG. 12, as stripper 11 is moved from its retracted position (as shown in FIG. 1) toward its fully operative position (as shown in FIG. 14), the pairs of coil engaging surfaces 37a, 37b; 39a, 39b; and 41a, 41b substantially simultaneously engage the respective chord segments of their respective coil groups thereby to effect axial movement of all of the coil groups substantially simultaneously for axial insertion of all of the coil groups into stator slots S without one of the coil groups (i.e., the lowermost coil group) being required to force one or both of the remaining coil groups to move axially with respect to the fingers 7 and stator core 3 thereby to minimize stretching of the coil wires and possible damage to the insulation on the coil wires.

Still further, the flutes or fins 31 of stripper body 13 are of different lengths, with a first group 43 of fins being generally in circumferential register with the first or upper pair of coil engaging surfaces 37a, 37b being longer than a second group 45 of fins which are in circumferential or angular register with the second or intermediate pair of coil engaging surfaces 39a, 39b, which in turn are somewhat longer than the shorter or third group 47 of fins in angular alignment with the third or lowermost pair of coil engaging surfaces 41a, 41b. This construction is shown in FIGS. 5-7.

Referring now to FIGS. 2 and 8-11, the windings W for stator 3 are illustrated for a two-pole, three-phase motor. The windings W are formed into coil groups G, each of which has one or more coils C, with each of the coils including a predetermined number of turns of suitable magnet wire. The magnet wire is typically coated with a suitable electrical insulative varnish or the like in the manner well known to those in the art. More specifically, as shown herein coil groups G are arranged in three pairs, as indicated at G1A, G1B; G2A, G2B; and G3A, G3B. Each of the coil groups constituting each pair of coil groups comprises two coils C wound concentrically with respect to one another, and each of the coil groups constituting each pair of coil groups is placed diametrically opposite one another within opening 33 of the circular array of fingers 7. Each of the pairs of coil groups is angularly offset with one another such that the coil group pairs are uniformly distributed around the circular array of fingers 7. As shown, three pairs of coil groups are placed on the fingers, with each pair of coil groups being angularly offset from one another by an angle of about 120 degrees. However, those skilled in the art will recognize that the method and apparatus of the present invention may be used in conjunction with a wide array of other winding configurations.

Figure 8:
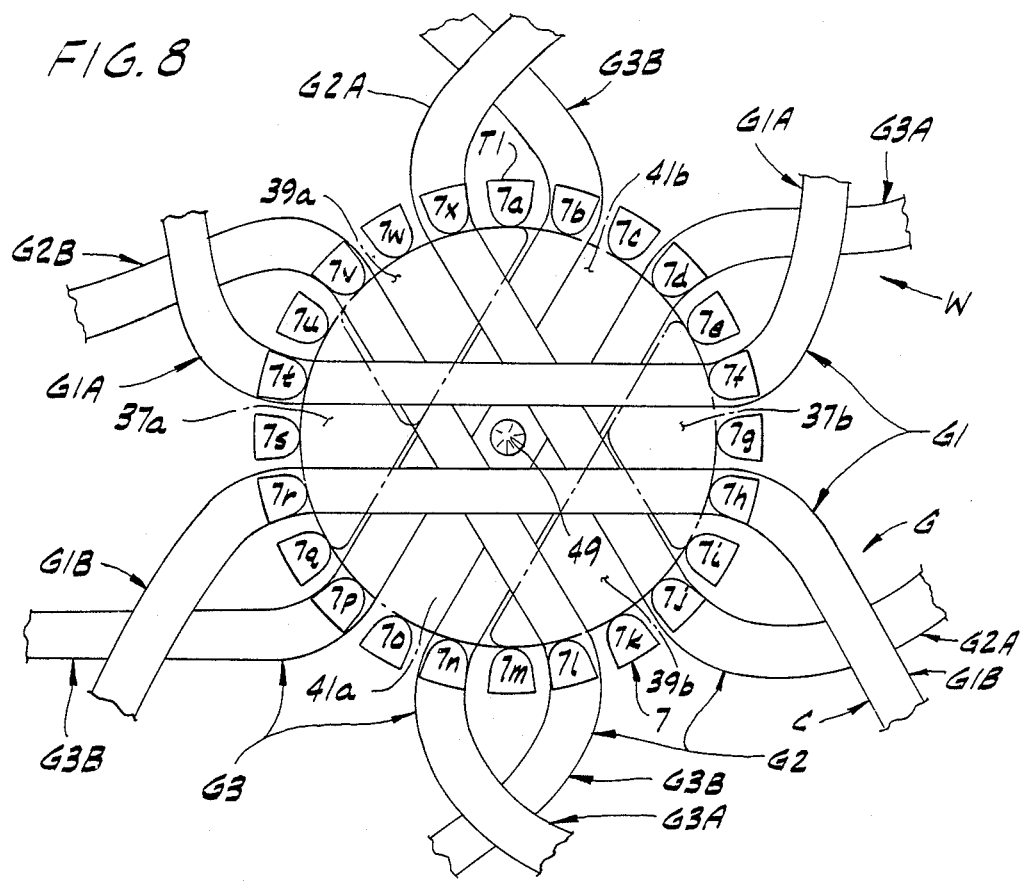
FIG. 8 is a top plan view of the circular array of fingers of the axial coil inserter, as shown in FIGS. 1 and 2, having gaps therebetween and further illustrating three pairs of coil groups, with each coil group having two coils therein, with the coil groups being arranged in pairs diametrically opposite one another, with the pairs being equally angularly spaced relative to one another at approximately 120 degrees, and with the portions of the coil groups spanning between the fingers, constituting chord segments, being axially displaced from one another and angularly overlapping one another.

As is also shown in FIGS. 8-11, each of the coil groups has a chord segment CS which extends across opening 33 from one preselected finger to another. As best shown in FIGS. 2 and 8, the coil groups G1A, G1B; G2A, G2B; and G3A, G3B, are axially displaced from one another heightwise along fingers 7 such that a first or uppermost coil group G1A, G1B is placed on top of a second or intermediate coil group G2A, G2B, and the intermediate coil group is placed on top of a third or lowermost coil group G3A, G3B. Each of the pairs of coil groups is generally equally angularly offset from one another by an angle of about 120°.

Figure 9:
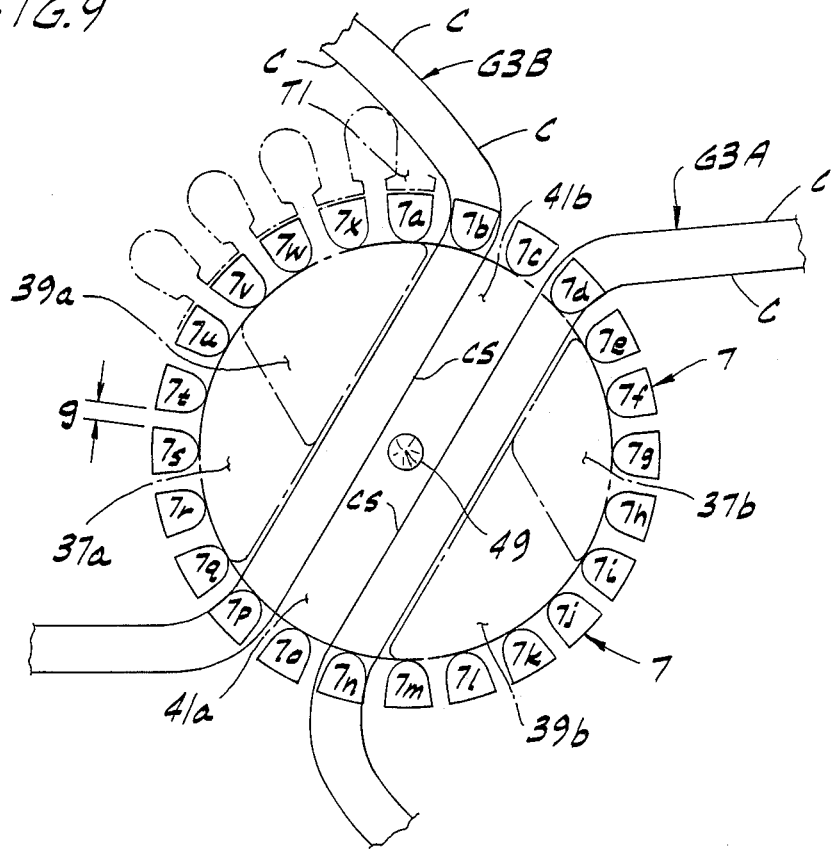
FIG. 9 is a view similar to FIG. 8, illustrating a lowermost pair of coil groups placed on the fingers, with the chord segments thereof adjacent the innermost portions of the fingers being engageable by the lowermost coil engaging surfaces of the stripper shown in FIG. 3.

More particularly, referring to FIGS. 8-11, and even more specifically, referring to FIGS. 9-11, there are twenty-four fingers 7a-7x shown in a circular array, with a gap g between each adjacent finger 7. As shown in FIG. 9, when the lowermost pair of coil groups G3A, G3B is placed on fingers 7, the outermost coil C of coil group G3A is inserted within the gap g between the third and fourth fingers 7c and 7d, respectively, with the chord segments CS of the outermost coil C of coil group G3A extending substantially diametrically across opening 33 to the gap g between the 14th and 15th fingers 7n and 7o, respectively. Likewise, the innermost coil C of coil group G3A is disposed within the gap between the fourth and fifth fingers 7d and 7e, and its respective chord segment CS extends in a straight line fashion across opening 33 to the gap between the 13th and 14th fingers 7m and 7n. Similarly, the outermost coil C of coil group G3B is placed within the gap between the second and third fingers 7b and 7c and extends substantially diametrically across opening 33 to the gap g between the 15th and 16th fingers 7o and 7p. The innermost coil C of coil group G3B is inserted within the gap g between the first and second fingers 7a and 7b, and the chord segment CS extends in a straight line fashion across opening 33 to the gap between the 16th and 17th fingers 7p and 7q. As is shown in FIG. 9, the chord segments CS of the four coils C of coil groups G3A and G3B are parallel to one another, are symmetric with respect to the circular array of fingers 7, and are clear of the center point of the circular array of fingers (i.e., the chord segments do not overlay the center point of the circular array).

Referring to FIGS. 10 and 11, the manner in which the intermediate coil groups G2A, G2B are placed on the circular array of fingers, and the manner in which the outermost coil groups G1A, G1B are also placed on the array of fingers is illustrated such that when all three pairs of coil groups are placed on the circular array of fingers, their respective chord segments CS are angularly displaced and axially offset from one another, as illustrated in FIG. 8. However, in FIG. 8 it will be noted that all of the chord segments CS of all of the coil groups are clear of the center point of the circular array of fingers. In this manner, as shown in FIGS. 12-14, an axially extended pointed probe 49, rigidly mounted within a central opening 50 of stripper body 13, extends axially out beyond the outermost coil engaging surfaces 37a, 37b of stripper body 13 so as to pass between and to physically separate the chord segments CS of each pair of coil groups G3A, G3B; G2A, G2B; and G1A, G1B.

In this manner, the outermost portions of the coil segments CS for the uppermost pair of coil groups G1A, G1B are clear of the chord segments of any of the other coil groups such that these outermost portions of the chord segments of the first coil set are engageable by the outermost or first pair of coil engaging surfaces 37a, 37b of stripper 13. Likewise, the outermost portions of the coil segments CS of the intermediate pair of coil groups G2A, G2B are clear of the chord segments of the other two pairs of coil sets so that the outermost segments CS of the intermediate coil sets are engageable by the intermediate coil engaging surfaces 39a, 39b of stripper 13. Still further, the outermost chord segments CS of the lowermost pair of coil groups G3A, G3B are clear of the chord segments of the other two pairs of coil groups such that the outermost portions of the chord segments CS of the lowermost pair of coil groups are engageable by the lowermost coil engaging operative surfaces 41a, 41b of stripper 13 in such manner that the respective chord segments CS of the outermost or upper coil group G1A, G1B, the outermost portions of the chord segments CS of the intermediate pair of coil groups G2A, G2B, and the outermost portions of the chord segments CS of the lowermost pair of coil groups G3A, G3B are substantially simultaneously engaged by their respective coil engaging operative surfaces 37a, 37b; 39a, 39b; and 41a, 41b of stripper 11 thereby to substantially simultaneously move the coil groups axially along fingers 7 for the substantial simultaneous axial insertion of the coil C comprising the various coil groups into their respective slots S of stator 3 so as to constitute the windings W of the stator.

In operation, with the coil groups placed on fingers 7 in the manner generally illustrated in FIGS. 2 and 8, and with a stator core 3 rigidly clamped in place on the upper ends of bars 9 with fingers 7 extending through bore B of the stator (as shown in FIG. 1), and with the fingers 7 in radial register with teeth T of the stator, axial coil inserter 1 is energized so as to move ram 21 and stripper 11 from its lower, retracted position, as shown in FIGS. 1 and 12, toward its operative position, as shown in FIG. 14, such that the coil engaging surfaces 37a, 37b; 39a, 39b; and 41a, 41b of stripper body 13 substantially simultaneously engage the outer portions of chord segments CS of the coil groups G1A, G1B; G2A, G2B; and G3A, G3B, respectively, as shown in FIG. 12. As stripper 11 continues to move from its retracted position toward its operative position, all of the coil groups are substantially simultaneously moved axially along fingers 7, and the above-noted coil engaging surfaces on the stripper, together with stripper fins 43, 45, and 47, draw the coils C of their respective coil groups axially into bore B of stator core 3 and positively feed the coils through the gaps g of fingers 7 into the respective slots S of the stator core in register with the gaps g between the fingers. As stripper 11 moves to its fully operative position, as shown in FIG. 14, the sides of the coils C of the various coil groups are axially inserted into their respective stator slots S, and the chord segments CS of coil groups G1A, G1B roll off the upper ends of fingers 7 so as to be disposed on the upper face of the stator core. The chord segments CS of the other coil groups G2A, G2B and G3A, G3B at least partially overlie the bore B of the stator core above the upper face of the stator (as shown in FIG. 14) such that all of these chord segments CS constitute end turns E at one face of the stator core. Likewise, the ends of the coils opposite chord segments CS are drawn axially upwardly along fingers 7 and span in chordwise direction between the slots of stator core 3 into which the sides of their respective coils have been inserted such that the lower portions of the coil groups form end turns E of the windings W on the upper and lower faces of the stator, as shown in FIG. 14. Probe 49 maintains the coil segments CS of the various coil groups separate from one another during insertion.

With the coil groups inserted into their respective core slots S in the manner as generally illustrated in FIG. 14, stripper 11 is retracted from its fully operative position to its retracted position so that stripper 11 and probe 49 move clear of the now axially inserted windings W and stator core 3. The stator core is then unclamped from the axial coil inserting apparatus 1 of the present invention, and is taken to suitable forming apparatus (not shown) for blocking, forming, and lacing of the end turns E of windings W in a conventional manner well known to those skilled in the art. It will be understood, however, that the above-noted subsequent operations of blocking, forming, and lacing do not, per se, constitute a portion of this invention. It will also be appreciated that substantially simultaneously with the insertion of the coils C constituting windings W into the respective slots S of stator core 3, wedges (not shown) may be inserted into the slots S so as to insulate and maintain the coils C in their respective slots, generally in the manner described in the above-noted U.S. Pat. No. 3,324,536.

Those skilled in the art will particularly note that the axial coil inserter 1 of this invention and the above-described method of this invention of substantially simultaneously inserting a plurality of axially and angularly overlapping coil groups into the stator slots of a stator is efficiently carried out in accordance with this invention in a one-step process. That is, after the various coil groups are placed on fingers 7 in the manner herein described, and after stator 3 is inserted on fingers 7 and clamped in place in the manner herein described, all of the overlapping coils of winding W are inserted simultaneously on one operation of stripper 11 from its retracted to its fully operative position.

In view of the above, it will be seen that the other objects of this invention are achieved and other advantageous results obtained.

As various changes could be made in the above constructions or method without departing from the scope of the invention, it is intended that all matter contained in the above description or shown in the accompanying drawing shall be interpreted as illustrative and not in a limiting sense.

What is claimed is:

1. Apparatus for simultaneously axially inserting a plurality of coil groups into a stator of a dynamoelectric machine, with the coil groups constituting the windings of the dynamoelectric machine, said stator having a central bore and a plurality of teeth spaced at equal angular intervals around the bore with a slot between each of the teeth extending radially outwardly from the bore, said apparatus comprising a plurality of elongate fingers, one for each of said stator teeth, arranged in a circular array and having a gap between each of said fingers, each of said fingers being in register with a respective said stator tooth, and with the gaps therebetween being in register with a respective stator slot, said apparatus having means for rigidly supporting said stator on said fingers, each of said coil groups having one or more coils, said pairs of coil groups being placed on said fingers such that each of said coils is received in respective gaps between said fingers with a segment of each of said coils extending across the chord of the circular array of fingers and being referred to as a chord segment, said pairs of coil groups being spaced axially along said fingers with the chord segments of said coils of each pair of said coil groups being spaced axially of the fingers relative to the chord segments of the coils of the others of said pairs of said coil groups, said apparatus further comprising a stripper movable axially within said circular array of fingers from a retracted position in which said stripper is clear of said chord segments toward an operative position in which said stripper substantially simultaneously engages said chord segments of all of said coils to a fully operative position in which said coils are at least in part drawn axially through said stator bore and in which portions of said coils are inserted through their respective gaps between said fingers into said respective slots of said stator, said coil groups being arranged in pairs diametrically opposite one another, said stripper comprising a body having an operative surface facing generally axially outwardly of said circular array of fingers toward said stator, said operative surface having a first pair of operative faces arranged substantially diametrically opposite one another engageable with said chord segments of a first pair of coil groups, and a second pair of operative faces substantially diametrically opposed with respect to one another with said second pair of operative surfaces being angularly and axially displaced from said first pair of operative surfaces for engaging the chord segments of a second pair of said coil groups substantially simultaneously with said first pair of operative surfaces engaging the chord segments of said first pair of coil groups such that said first and said second pairs of said coil groups are inserted in said stator substantially simultaneously as said stripper moves from its retracted to its operative position.

2. Apparatus as set forth in claim 1 wherein said operative surface of said stripper further comprises a third pair of operative faces substantially diametrically opposed with respect to one another, with said third pair of operative surfaces being angularly and axially displaced from both said first and said second pair of operative surfaces for substantially simultaneously engaging the chord segments of a third pair of said coil groups such that said stripper engages the chord segments of said first, said second, and said third pairs of coil groups substantially simultaneously as said stripper moves axially with respect to said fingers from its retracted toward its operative position.

3. Apparatus as set forth in claim 2 wherein said stripper body has a plurality of axial flutes in its outer wall defining a plurality of axial grooves, there being one axial groove for each of said fingers, with each of said fingers being slidably received in a respective one of said grooves.

4. Apparatus as set forth in claim 3 wherein a first set of said flutes in register with said first pair of operative surfaces of said stripper have a first predetermined length, wherein said axial flutes in register with said second pair of operative surfaces have a second or intermediate predetermined length shorter than the predetermined length of said first set of flutes, and wherein said flutes in register with said third pair of of operative surfaces have a length shorter than the length of said intermediate flutes, with the upper ends of said flutes proximate their respective operative surfaces being radiused so as to cooperate with their respective operative faces for the axial insertion of said coils into said slots as said stripper moves from its retracted to its fully operative position.

5. Apparatus as set forth in claim 1 wherein said stripper includes an elongate probe extending axially from said stripper for maintaining said chord segments of said pairs of said coil groups separate from one another during insertion.

6. A stripper for an axial coil inserter comprising a one-piece stripper body, said body having a longitudinal center axis and generally fluted circular side walls, said stripper having an operative surface at one end of said body, said operative surface comprising a first pair of operative faces substantially diametrically opposite one another with respect to said axial centerline, and a second pair of operative faces substantially diametrically opposed with respect to one another and axially displaced from said first pair of operative surfaces.

7. A stripper as set forth in claim 6 wherein said axial coil inserter has a circular array of stationary fingers, said stripper body having a plurality of axial flutes in its outer wall defining a plurality of axial grooves, there being one axial groove for each of said fingers, with each of said fingers being slidably received in a respective one of said grooves.

8. A stripper as set forth in claim 7 wherein a first set of said flutes in register with said first pair of operative surfaces of said stripper have a first predetermined length, wherein said axial flutes in register with said second pair of operative surfaces have a second or intermediate predetermined length shorter than the predetermined length of said first set of flutes, with the upper ends of said flutes proximate their respective operative surfaces being radiused so as to cooperate with their respective operative faces for the axial insertion of said coils into said slots as said stripper moves from its retracted to its fully operative position.

9. A method of substantially simultaneously axially inserting a plurality of coils of magnet wire into the stator of a dynamoelectric machine, with said coils constituting the windings of said dynamoelectric machine, said stator comprising a core having an axial bore therethrough and a plurality of teeth extending radially outwardly from said bore with said teeth being spaced at substantially equally angular intervals around the bore and with the space between said teeth constituting axial slots for receiving said windings, said method being performed on an axial coil inserting apparatus having a plurality of fingers, one for each of said teeth, arranged in a circular array and aligned with a respective said stator tooth, said windings comprising a plurality of coil groups each having one or more coils, there being at least two of said coil groups, said coil groups being placed on said fingers such that a first coil group is in spaced relation axially above a second coil group, and such that the portions of said coil groups extending between said fingers, constituting chord segments, at least in part axially overlap with the chord segments of other of said coil groups, said axial coil inserter having means for fixedly holding said stator in fixed axial position with respect to said fingers, and a stripper positioned within said circular array of said fingers axially movable with respect to said fingers and with respect to said stator for movement from a retracted position in which said stripper is clear of said chord segments, and an operative position in which said stripper engages said chord segments and effects the insertion of said coil groups into their respective said slots of said stator, wherein said method comprises the steps of:

placing said first coil group on said fingers with said chord segments thereof spanning between their respective said fingers;

placing a second coil group on said fingers, with the second coil group being spaced axially on said bars with respect to said first coil group, and with said chord segments of said second coil group spanning between said fingers and angularly overlapping at least in part with said chord segments of said first coil group;

axially moving said stripper from its retracted position toward its operative position so as to substantially simultaneously engage said chord segments of both said first and second said coil groups by said stripper thereby to substantially simultaneously axially move said first and said second coil groups along said fingers, and so as to substantially simultaneously effect the insertion of said coils of both said first and said second coil groups into their respective slots of said stator without said coil groups of said second coil group placing substantial axial force on said first coil group.

10. The method of claim 9 further comprising placing a third coil group on said fingers with the third coil group being at least partially spaced axially on said fingers with respect to both said first and said second coil groups, and with said chord portions of said third coil group spanning between said fingers.

11. The method of claim 9 further comprising placing a third pair of coil groups on said fingers with the coil groups of said third pair of coil groups being at least partially angularly offset with respect to the chord segments of said first and said second pair of coil groups, and with said third pair of coil groups being spaced axially on said fingers with respect to both said first and said second coil groups, and with said chord portions of said third pair of coil groups spanning between said fingers and being angularly overlapping at least in part with said chord portions of both said first and said second pair of coil groups.

12. A method of substantially simultaneously axially inserting a plurality of coils of magnet wire into the stator of a dynamoelectric machine, with said coils constituting the windings of said dynamoelectric machine, said stator comprising a core having an axial bore therethrough and a plurality of teeth extending radially outwardly from said bore with said teeth being spaced at substantially equally angular intervals around the bore and with the space between said teeth constituting axial slots for receiving said windings, said method being performed on an axial coil inserting apparatus having a plurality of fingers, one for each of said teeth, arranged in a circular array and aligned with a respective said stator tooth, said windings comprising a plurality of coil groups each having one or more coils, one of said coil groups being paired with another of said coil groups with said coil groups of said pair being diametrically opposed with respect to one another on opposite sides of said stator bore, there being at least two of said pairs of coil groups with the coil groups of one of said pairs of said coil groups at least in part angularly overlapping with portions of the coil groups of said other pair of coil groups such that with said coil groups placed on said fingers, a first pair of coil groups is in spaced relation axially above said second pair of coil groups, and such that the portions of said coil groups extending between said fingers, constituting chord segments, at least in part angularly overlapping with the chord sections of said coil groups of said second pair of coil groups, said axial coil inserter having means for fixedly holding said stator in fixed axial position with respect to said fingers, and a stripper positioned within said circular array of said fingers axially movable with respect to said fingers and with respect to said stator for movement from a retracted position in which said stripper is clear of said chord segments, and an operative position in which said stripper engages said chord segments and effects the insertion of said coil groups into their respective said slots of said stator, wherein said method comprises the steps of:

placing said first pair of coil groups on said fingers substantially opposite one another, with said chord segments thereof spanning between their respective said fingers;

placing a second pair of coil groups on said fingers, with the coil groups of the second pair of coil groups being at least partially angularly offset with respect to said first pair of coil groups, and with said second pair being spaced axially on said bars with respect to said first pair of coil groups, and with said chord segments of said second pair of coil groups spanning between said fingers and being angularly overlapping at least in part with said chord segments of said first pair of coil groups;

axially moving said stripper from its retracted position toward its operative position so as to substantially simultaneously engage said chord segments of both said second and said first pair of coil groups thereby to substantially simultaneously axially move said first and said second pairs of said coil groups along said fingers, and so as to substantially simultaneously effect the insertion of said coils of both said first and said second pairs of coil groups into their respective slots of said stator without said coil groups of said second pair of coil groups placing substantial axial force on said first pair of coil groups.

* * * * *